United States Patent
Kashiwagi et al.

[11] Patent Number: 5,846,626
[45] Date of Patent: Dec. 8, 1998

[54] OPTICAL RECORDING MEDIUM AND METHOD OF PRODUCING SAME

[75] Inventors: Toshiyuki Kashiwagi; Motohiro Furuki, both of Tokyo; Shoji Fukuchi; Yoshitake Yanagisawa, both of Shizuoka, all of Japan

[73] Assignee: Sony Corporation and Sony Disc Technology Inc., Japan

[21] Appl. No.: 604,569

[22] Filed: Feb. 21, 1996

[30]     Foreign Application Priority Data

Feb. 24, 1995 [JP] Japan .................................. 7-037023

[51] Int. Cl.$^6$ ...................................................... B32B 3/00
[52] U.S. Cl. ...................... 428/64.1; 428/64.2; 428/64.4; 428/64.7; 428/694 R; 428/694 SL; 428/694 SG; 430/270.11; 430/495.1; 430/945; 369/275.4; 369/283
[58] Field of Search .................................. 428/64.1, 64.2, 428/64.4, 64.7, 457, 688, 694 R, 694 SL, 694 SG; 430/270.11, 495.1, 945; 369/275.1, 275.4, 283

[56]                References Cited

U.S. PATENT DOCUMENTS

| | | | |
|---|---|---|---|
| 4,319,252 | 3/1982 | Drexler | 346/135.1 |
| 4,652,498 | 3/1987 | Wolf et al. | 428/461 |
| 5,053,288 | 10/1991 | Hashimoto et al. | 428/694 |
| 5,276,673 | 1/1994 | Kobayashi et al. | 369/275.3 |

FOREIGN PATENT DOCUMENTS

| | | |
|---|---|---|
| 398 714 | 11/1990 | European Pat. Off. . |
| 409 663 | 1/1991 | European Pat. Off. . |
| 473 785 | 3/1992 | European Pat. Off. . |
| 26 53 831 | 6/1978 | Germany . |
| 58-196636 | 11/1983 | Japan . |
| 62-129953 | 6/1987 | Japan . |
| 62-234245 | 10/1987 | Japan . |
| 321 704 | 6/1989 | Japan . |
| 3-113846 | 5/1991 | Japan . |
| 424 809 | 5/1991 | Japan . |
| 2 236 009 | 3/1991 | United Kingdom . |

*Primary Examiner*—Patrick Ryan
*Assistant Examiner*—Elizabeth Evans
*Attorney, Agent, or Firm*—Ronald P. Kananen

[57]                ABSTRACT

An optical recording medium capable of recording and/or reproducing an information by using a laser beam, comprising: a support layer having an information signal-recording portion on one side surface thereof on which said laser beam is incident, and a transparent layer disposed over the support layer and having a thickness smaller than that of the support layer. In accordance with the present invention, there are further provided production method for optical or magneto-optical discs whereby a high density reproduction can be achieved.

21 Claims, 12 Drawing Sheets

FIG.4A   GLASS SUBSTRATE
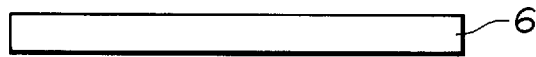
FIG.4B   COATING OF RESIST
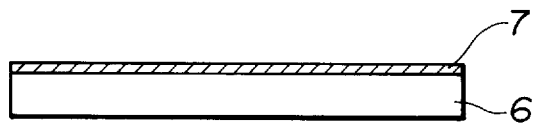
FIG.4C   EXPOSURE TO LASER BEAM
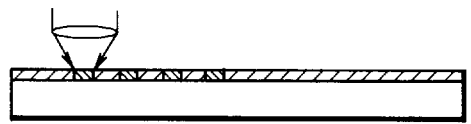
FIG.4D   DEVELOPING TREATMENT
FIG.4E   ELECTROLESS PLATING
FIG.4F   ELECTRO PLATING
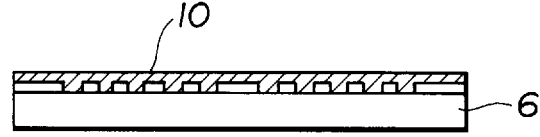
FIG.4G
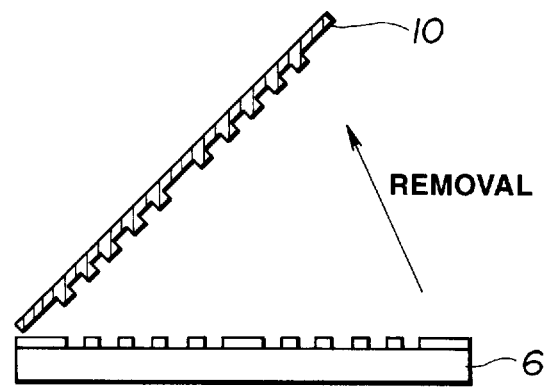

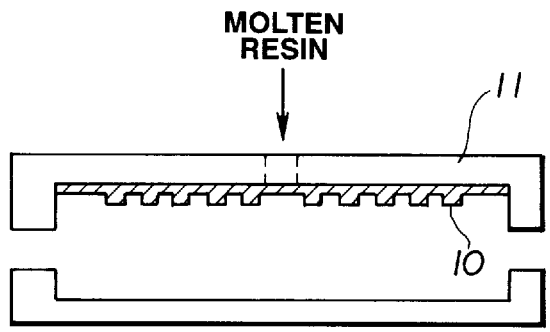
FIG.5A
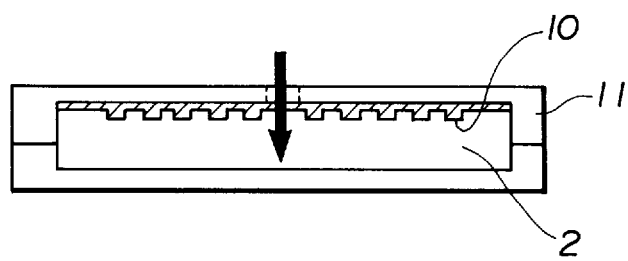
FIG.5B
FIG.6A DISK SUPPORT LAYER
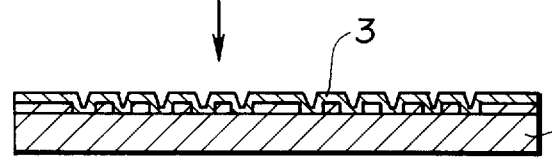
FIG.6B Aℓ SPUTTERING
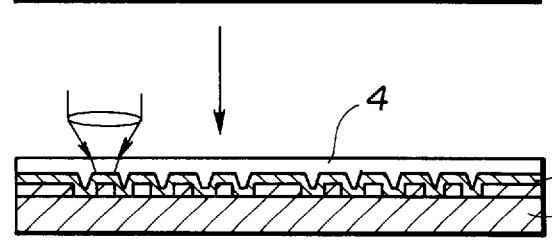
FIG.6C SPIN-COATING FIG.10A LIGHT-PERMEATING LAYER 
FIG.10B Aℓ SPUTTERING 
FIG.10C ADHERING 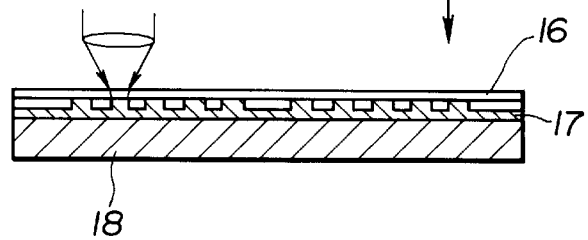

OPTICAL RECORDING MEDIUM AND METHOD OF PRODUCING SAME

BACKGROUND OF THE INVENTION

1. Field of the Invention:

This invention relates to an optical recording medium and a method of producing the optical recording medium, and more particularly to an optical recording medium capable recording and/or reproducing an information signal on a signal recording medium by radiation of a laser beam and including a transparent layer through which the laser beam is radiated on the signal recording layer, and a method of producing such an optical recording medium.

2. Prior Art:

As shown in FIG. 1, a conventional recording medium such as an optical disc, includes a transparent layer 51 having a thickness of, for example, about 1.2 mm. The transparent layer 51 has on one side surface thereof information pits or guide grooves constituting a signal recording region or portion. On an outside of the signal recording region or portion, there is in turn provided a reflecting film layer 52 a protective film layer 53 for protecting the reflecting layer 52. The information pits or guide grooves are radiated with a laser beam condensed by an objective lens 54 of an optical pick-up device. In a duplication step of the manufacture process for the optical disc such as a compact disc, a stamper prepared in a preceding mastering step is mounted to a press. Successively, a resin material for a substrate such as polycarbonate is poured into the press while heating and then subjected to a compression molding process to transfer a pit pattern of the stamper onto the substrate. This substrate also serves as the transparent layer 51. Since a light permeates through the substrate as the transparent layer 51, it is necessary to provide a reflecting layer 52 made of aluminum by using a vacuum deposition method. The reflecting layer 52 is further over-coated with the protective film 53 to prevent damage to the reflecting layer 52.

Accordingly, as viewed from the side of the objective lens 54 of the optical pick-up device, the laser beam for reproduction is first radiated on the information pit through the transparent layer 51 having a thickness of, for example, 1.2 mm. The light reflecting on the information pits then moves back through the transparent layer 51 so that the necessary information can be read out from the optical disc.

A thickness of the transparent layer 51 serving as a substrate has a close relation with deformation due to stress, heat and moisture, especially inclination which is called "skew," and characteristic of the laser beam condensed on the information pit, especially a coma aberration. Assuming that the skew of the optical disc is maintained constant, the transparent layer having a smaller thickness contributes to formation of a spot with a smaller aberration.

Meanwhile, recently, there is an increasing demand for a high-density optical disc. The high densification of the optical disc can be achieved by increasing a numerical aperture NA of the objective lens of the optical pick-up device and lessening a track pitch of the optical disc. In this case, there remarkably appears the afore-mentioned tendency, namely increase in aberration amount of the spot when the skew is maintained constant, and deterioration of reproduced signal due to the increased aberration. However, in the case of the transparent layer having a thickness of 1.2 mm, the problem cannot be overcome unless the transparent layer is made of an extremely flat and non-deformable material such as a glass plate.

In addition, taking into consideration a magneto-optical disc in which the afore-mentioned reflecting layer is replaced with a recording layer made of a recording material, as shown in FIG. 2, since a transparent layer 61 has a thickness of 1.2 mm, an external magnetic field from a magnetic field modulation coil 55 is unavailable to record and/or reproduce information signal on the recording layer 62. In consequence, the magnetic field modulation coil 55 must be disposed on a side of a protective layer 63 opposite to a side where the transparent layer 61 and the objective lens 56 of the optical pick-up device are provided. As a result, such an arrangement limits reduction in size of a recording and reproducing apparatus in which the magneto-optical disc is used.

SUMMARY OF THE INVENTION

It is therefore an object of the present invention to provide an optical recording medium capable of high density reproduction of information stored thereon.

It is another object of the present invention to provide a method of producing such an optical recording medium, in which productivity thereof is highly improved.

It is a further object of the present invention to provide an optical recording medium of a magneto-optical type capable of achieving reduction in size of a recording and reproducing apparatus therefor.

In a first aspect of the present invention, there is provided an optical recording medium capable of recording and/or reproducing an information by using a laser beam, comprising a support layer having an information signal-recording portion on one side surface thereof on which the laser beam is incident, and a transparent layer disposed over the support layer and having a thickness smaller than that of the support layer.

In a second aspect of the present invention, there is provided a method of producing an optical recording medium, comprising the steps of pouring a material for a substrate into a press while heating and subjecting the material to a compression molding process to form the substrate having transferred information pits thereon, forming a reflecting layer over the substrate, and forming a transparent layer capable of permeating a laser beam and having a thickness smaller than that of the substrate, over the reflecting layer.

In a third aspect of the present invention, there is provided a method of producing an optical recording medium, comprising the steps of pouring a transparent resin into a press while heating, and subjecting the resin to a compression molding process to form a transparent layer having transferred information pits thereon, forming a reflecting layer over the information pits formed on the transparent layer, and adhering the transparent layer over a substrate having a thickness larger than that of the transparent layer through said reflecting layer.

In a fourth aspect of the present invention, there is provided a method of producing an optical recording medium capable of recording and/or reproducing an information by using a laser beam, comprising the steps of forming a magnetic recording film on one side surface of a substrate on which the laser beam is incident; and forming a transparent layer having a thickness smaller than that of the substrate over the magnetic recording film.

The optical recording medium according to the present invention, is provided with a transparent layer having a smaller thickness, for example, 0.5 mm or less, as compared with that of the support layer. As a result, even though a numerical aperture of an objective lens used in the optical pick-up device is large, deterioration of a reproduction signal due to a coma aberration can be limited to a low level, whereby a high density reproduction can be accomplished.

These and other objects, features and advantages of the present invention will become more apparent from the following detailed description when read in conjunction with the accompanying drawings and appended claims.

BRIEF DESCRIPTION OF THE DRAWINGS

FIGS. 4A to 4G are views continuously showing master disc-forming steps in a manufacturing process of the optical disc according to the first embodiment of the present invention.

FIGS. 5A and 5B are views showing injection-molding steps in a manufacturing process of the optical disc according to the first embodiment of the present invention.

FIGS. 6A to 6C are views showing reflecting film- and transparent layer-forming steps in a manufacturing process of the optical disc according to the first embodiment of the present invention.

FIG. 10A to 10C are views showing reflecting layer-forming and disc substrate-forming steps in a manufacturing process for the optical disc as shown in FIG. 9, according to the second embodiment of the present invention.

DETAILED DESCRIPTION OF PREFERRED EMBODIMENTS

Figure 1:
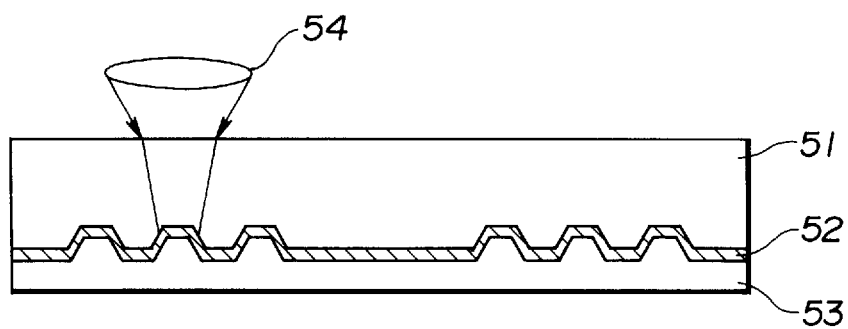
FIG. 1 is a view schematically showing a structure of a conventional optical recording medium.
Figure 2:
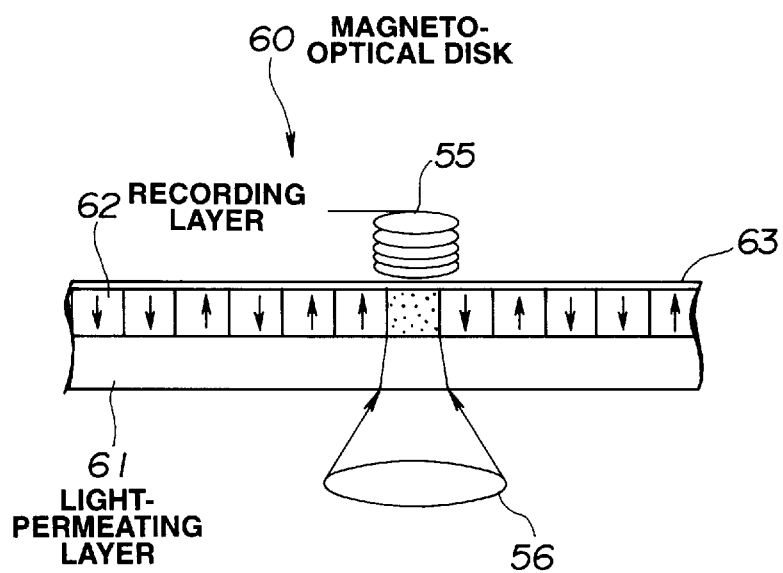
FIG. 2 is a view schematically showing a structure of a conventional magneto-optical disc.

The preferred embodiments of the present invention are described below by referring to the accompanying drawings in which an optical recording medium produced according to a production method of the present invention is illustrated.

In the preferred embodiments described below, there is illustrated an optical disc of such a type capable of reproducing information signals depending upon a quantity of a reflecting beam resulting from radiation of a laser beam onto the optical recording medium. In the first embodiment, a transparent layer having a thickness of about 100 $\mu$m is used while, in the second embodiment, the transparent layer having a thickness of 5 mm or less is used.

Generally, when the optical disc is injection-molded, a central portion thereof where a center bore is to be formed has a smaller thickness than the remaining base portion of the optical disc. By this, a cooling rate of the central portion is promoted as compared with that of the remaining base portion to thereby prevent occurrence of after-tack or sink mark of the molded resin. That is, the thin central portion functions as a stopper based on the rapid curing. The provision of the thin central portion advantageously results in eliminating a birefringence of the optical disc and improving a transfer capability. The narrow central portion where the center bore of the optical disc is provided, is called "gate" and finally removed from the remaining base portion by stamping. As a result, the thin central portion gives no influence on a final shape of the optical disc. When the thickness of the gate is further narrowed, the aforementioned function as a stopper can be expected more certainly. However, in this case, there occurs another problem such as a deteriorated flowability of a resin to be molded. In addition, the same problem is promoted when it is intended to make a thickness of the base portion of the optical disc thinner. On the other hand, when the gate is widened, undesired birefringence and deterioration in the transfer capability are likely to occur though an optical disc having a small thickness is producible.

In the foregoing, a general concept is described with respect to a role played by the gate in an injection-molding of the optical disc.

Actually, when the gate is widened, the optical disc having a diameter up to 120 mm and a thickness up to 0.35 mm can be obtained with a good outer appearance. However, in this case, there occurs birefringence and deterioration in transfer capability. Under these circumstances, a spacing of the gate is narrowed to 0.25 mm to 0.3 mm whereby the optical disc having reduced birefringence and improved transfer capability can be obtained in case it has a thickness of 0.6 mm. Accordingly, when it is intended to obtain the optical disc having a thickness of 0.5 mm or less and a good signal characteristic, the spacing of the gate is required to be 0.1–0.2 mm or less. This condition makes it impossible to produce the optical disc practically. That is, under such a condition, a injection speed of the resin is considerably limited by the gate so that the resin cannot reach an outer peripheral portion of the optical disc. As a result, the optical disc having a desired diameter cannot be obtained. This is the reason why the optical disc having a thickness of 0.5 mm or less cannot be produced conventionally.

Possible measures for obtaining the optical disc having a thickness of 0.5 mm or less are suggested below.

One of the measures includes a method in which reproduction is carried out on a back side of a shaped substrate and an ultra-violet curing resin is coated by using a spin-coating method or the like and then cured. In this case, to the contrary, the optical disc having as large a thickness as 1 mm is difficult to produce. Even if a high viscous resin is used, the thickness of the optical disc is limited at most to 100 $\mu$m (0.1 mm). Incidentally, it is possible to increase the thickness of the optical disc by providing overcoat layers. However, non-uniformity is inevitably created upon coating of each layer and thereby promoted. This also fails obtain the optical disc having a thickness of 0.5 mm or less. Another measure includes the use of other sheet or film.

Figure 3:
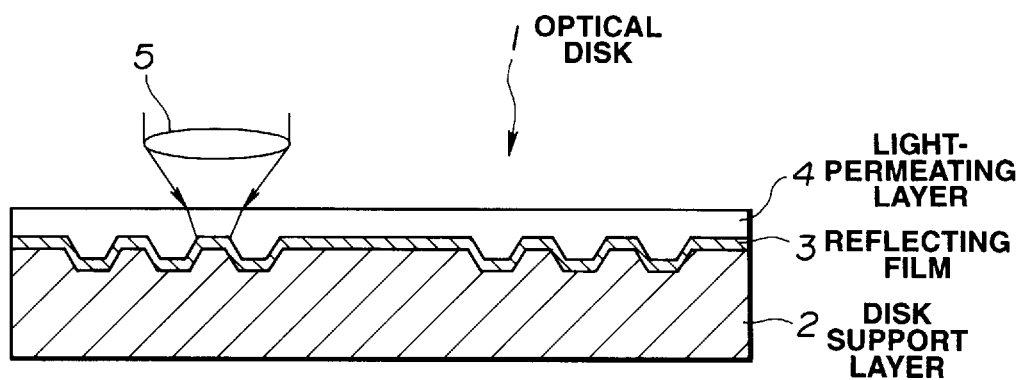
FIG. 3 is a view schematically showing a structure of an optical recording device according to a first embodiment of the present invention.

First, the optical recording medium according to the first preferred embodiment of the present invention is explained by referring to FIG. 3.

The optical disc 1 according to the first embodiment of the present invention includes a support layer 2 which is made of, for example, polycarbonate and has a thickness of 1.2 mm and on which pits are transferred by a injection-molding method, a reflecting film 3 composed of an aluminum layer having a thickness of about 500 Å and formed over the support layer, and a transparent layer 4 having a thickness of about 100 μm and formed by a spin-coating method.

Upon manufacture of the optical disc according to the first embodiment of the present invention, there are required a plurality of steps including a master disc-forming step as shown in FIGS. 4A to 4G, an injection-molding step as shown in FIGS. 5A and 5B, and a further layer-forming step as shown in FIG. 6A to 6C, in which the reflecting layer 3 is formed by sputtering of aluminum Al and the transparent layer 4 is formed by a spin-coating method.

In the master disc-forming step, a glass substrate 6 as shown in FIG. 4A is coated with a resist 7 as shown in FIG. 4B. The resist-coated glass substrate 6 is exposed to a radiation of a laser beam as shown in FIG. 4C and then subjected to a developing treatment as shown in FIG. 4D whereby pits or grooves 8 are formed on a surface of the resist-coated substrate 6. The substrate is successively subjected to an electroless plating treatment as shown in FIG. 4E to form a conductive film 9 on the substrate 6. Thereafter, as shown in FIG. 4F, the substrate 6 is subjected to an electro-plating treatment to deposit a nickel layer serving as a master disc 10. The thus-produced master disc 10 made of nickel is removed from the glass substrate 6 and utilized in a subsequent injection-molding step.

In the injection-molding step, as shown in FIG. 5A, the Ni master disc 10 which serves as a stamper is placed in a press into which a polycarbonate resin melted at an elevated temperature is poured and then subjected to a compression molding method to mold the disc support layer 2 as shown in FIG. 5B. As described above, the disc support layer 2 of the optical disc according to the first embodiment has a thickness of 1.2 mm.

Next, referring to FIGS. 6A to 6C, there is explained a further layer-forming step in which a reflecting layer 3 is deposited over the disc support layer 2 by sputtering of aluminum and then a transparent layer 4 is formed over the reflecting layer 3. First, the disc substrate 2 is subjected to sputtering to deposit an aluminum layer having a thickness of about 500 Å as shown in FIG. 6A whereby the reflecting layer 3 is formed on the disc substrate 2.

Figure 7A:
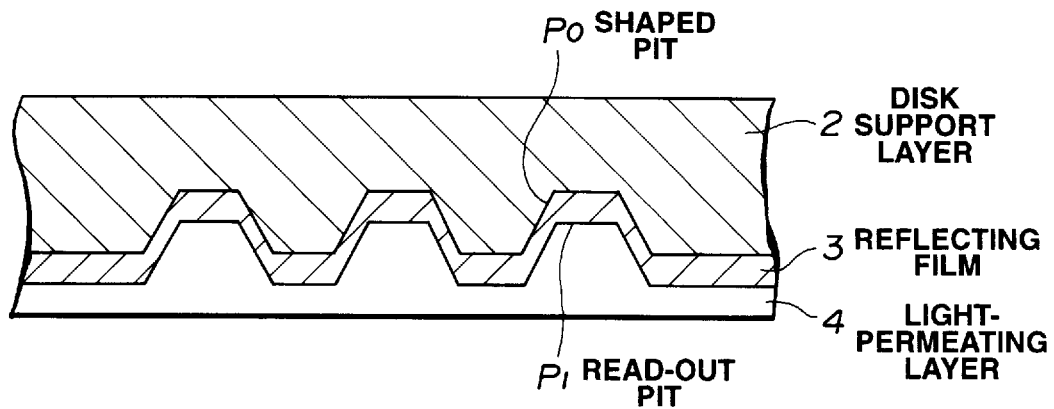
FIGS. 7A to 7C are views showing reflecting layer-forming steps in a manufacturing process of the optical disc according to the first embodiment of the present invention.
Figure 7B:
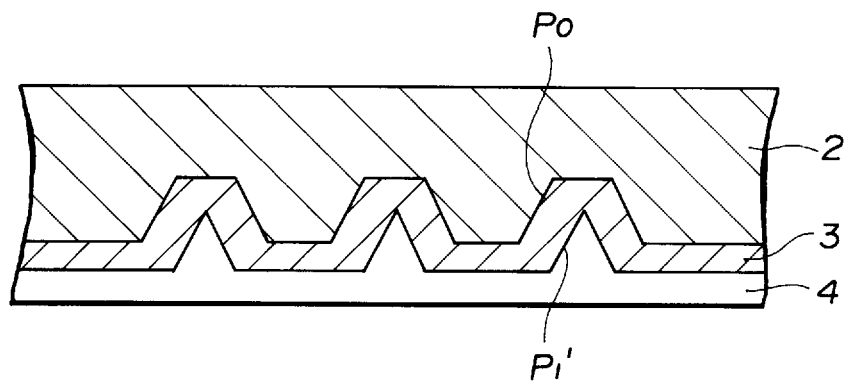
Figure 7C:
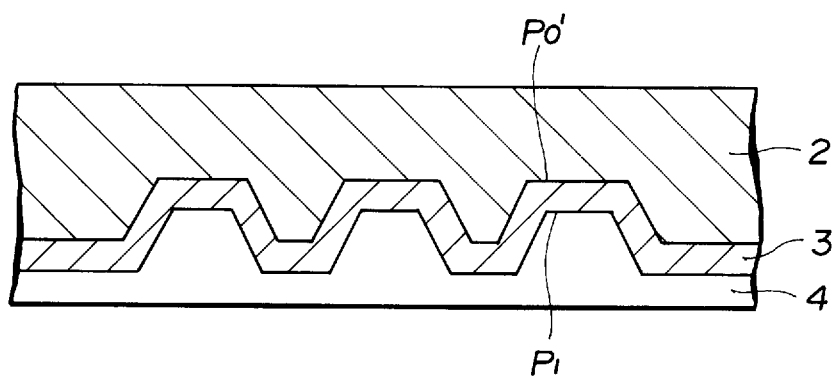

Upon formation of the reflecting layer 3, as shown in FIG. 7A, the aluminum deposit layer is grown in the direction perpendicular to a surface of the disc substrate where a shaped pit P0 is formed, so that a read-out pit P1 formed on the reflecting layer 3 has a shape identical to that of the shaped pit P0. This perpendicular growth of the reflecting layer 3 prevents formation of the pit P1' whose shape is inconsistent with that of the shaped pit P0. Alternatively, as shown in FIG. 7C, a relatively large groove is preliminarily provided on the Ni master disc 10 to form a correspondingly large shaped pit P0 on the disc support layer 2 whereby a possible deformation of the reflecting layer 3 can be corrected properly. However, in this case, the reflecting layer 3 must be uniformly formed over an entire surface of the disc support layer 2.

Next, as shown in FIG. 6C, the transparent layer 4 having a thickness of about 100 μm is formed on the reflecting layer 3 by a spin-coating method. Specifically, an ultra-violet curing resin (UV resin) is coated over the reflecting layer to form the transparent layer 4. Upon formation of the transparent layer 4, a thickness thereof is controlled by varying a revolution number of a spinner used for this purpose. The coating of the ultra-violet curing resin can be performed several times to obtain a desired thickness of the transparent layer 4.

Figure 8:
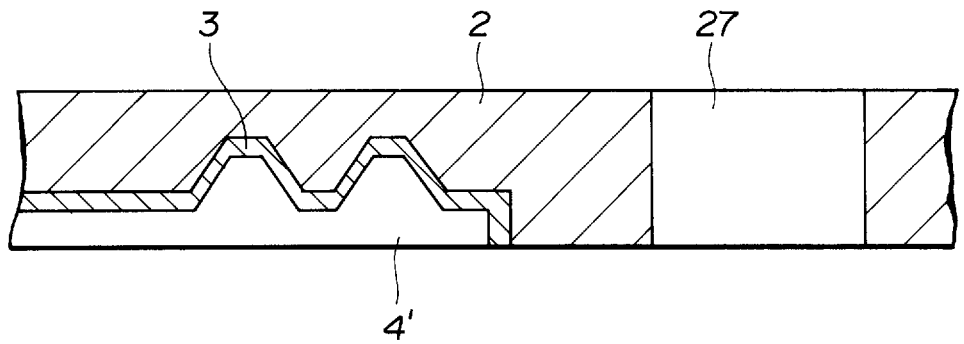
FIG. 8 is a view showing a manner for carrying out centering of a center bore of the optical disc according to the first embodiment of the present invention, when the transparent layer is adhered to the disc substrate.

Alternatively, the transparent layer 4 can be produced in the following manner. For example, an optically transparent hard substance such as an amorphous carbon may be subjected to a physical deposition method such as sputtering, or a chemical deposition method. Further, a separately prepared transparent layer 4' such as a polycarbonate film or a glass plate can be bonded onto the reflecting layer 3 by using an ultra-violet curing resin. In this case, as shown in FIG. 8, upon being subjected to the injection-molding, centering of a chucking center hole 27 of the disc support layer 2 is carried out simultaneously to facilitate a subsequent adhering step and eliminate complicated positioning of the center hole 27 when the transparent layer 4' is adhered onto the reflecting layer 3 formed on the disc support layer 2.

In the afore-mentioned first embodiment, the disc support layer 2 is produced in the form of an injection-molded substrate. This is because such a substrate can be easily produced by using a conventional process, equipment, materials or the like. Thus, since the disc support layer 2 has no requirements for optical characteristics such as permeability and birefringence, any substrate is usable for this purpose as far as it is made of a material capable of forming the pits or guide grooves thereon by transferring upon molding and having a sufficient mechanical strength. Accordingly, the disc support layer 2 can be formed of such a material as metal or glass whereby reduction in entire thickness of the optical disc including the transparent layer can be achieved and further the deformation of the optical disc is limited to a low level.

Meanwhile, a relation between a numerical aperture NA of the objective lens used for reproduction, a wave length λ of a laser beam which is radiated to form a reproduction spot on the optical disc, and a spot size φ is represented by the following equation:

$$\phi = 1.22 \times \lambda / NA$$

As apparently understood from the above equation, as the numerical aperture NA is increased, the spot size φ becomes smaller. Accordingly, when an objective lens having a large numerical aperture is employed, a high density reproduction can be achieved, namely a high density optical disc can be reproduced by using such an objective lens having a large numerical aperture. However, the numerical aperture NA gives an influence on a tolerance for inclination of the optical disc in addition to the spot size. That is, the tolerance for inclination of the optical disc is in proportion to $\lambda / |t \cdot (NA)^3|$ where t represents a thickness of the transparent layer.

Generally, when the optical disc is inclined relative to the optical system, a coma aberration is generated. In this case, a wave front aberration coefficient W is represented by the following equation:

$$W = \tfrac{1}{2} \cdot t \cdot \{(N^2-1)N^2 \sin\theta\cos\theta\}/(N^2-\sin^2\theta)^{-5/2} NA^3$$

wherein t represents a thickness of the transparent layer, N is a refractive index and θ represents an inclination angle.

For example, the numerical aperture NA is changed from 0.45 to 0.60, a skew margin is reduced from 0.60 to 0.25. In order to restore the reduced skew margin, the thickness of the transparent layer must be reduced. However, conventionally, as described above, the transparent layer has a thickness of 1.2 mm. In consequence, increase of the numerical aperture NA is restricted so that a high density reproduction and a high quality of the reproduction output cannot be achieved.

On the other hand, in the optical disc according to the first embodiment of the present invention, the tranparent layer has as small a thickness as about 100 μm, for example, by applying an ultra-violet curing resin by using a spin-coating method. As a result, even though the numerical aperture of the objective lens of the optical pick-up device is large, deterioration of the reproduction signal due to a coma aberration is prevented from occurring whereby a high density reproduction of the information signal can be achieved.

Figure 9:
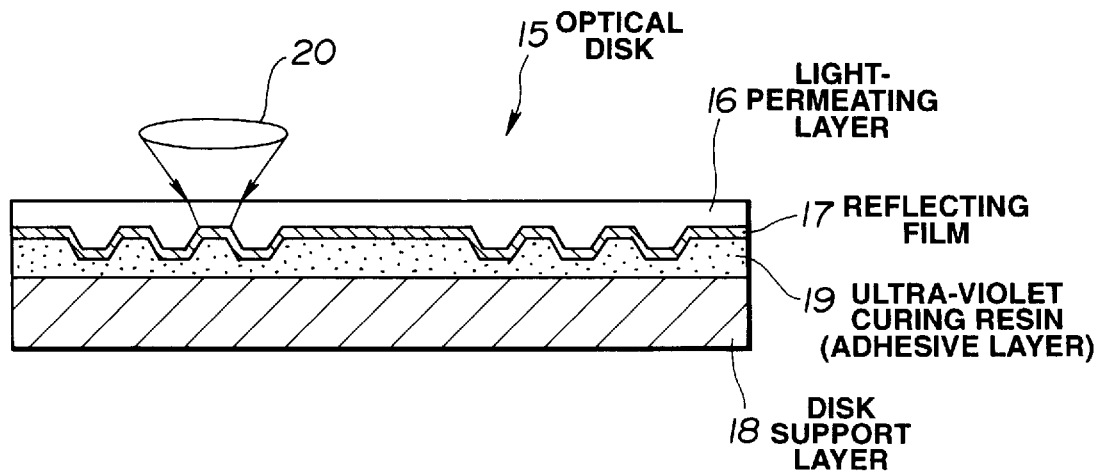
FIG. 9 is a view showing a structure of an optical disc according to a second embodiment of the present invention.

Next, an optical disc according to the second preferred embodiment of the present invention is described by referring to FIG. 9.

The optical disc according to the second preferred embodiment has a transparent layer 16 which is formed of an injection-molded polycarbonate resin and has a thickness not more than 0.5 mm, and on which information pits is formed by transferring from a master disc. Formed over the transparent layer 16 is a reflecting layer 17 which is an aluminum layer deposited by sputtering method and having a thickness of about 500 Å. The transparent layer 16 is adhered onto a disc support layer 18 having an adequate mechanical strength through the reflecting layer 17 and further an ultra-violet curing resin 19. The ultra-violet curing resin 19 serves as an adhesive layer. It is desirable that a total thickness of the adhesive layer 19 and the disc support layer 18 is not less than 0.7 mm.

The manufacture of the optical disc according to the second preferred embodiment of the present invention needs similar steps to those including the master disc-forming step as shown in FIGS. 4A to 4G, the injection-molding step as shown in FIGS. 5A and 5B and the further layer-forming step as shown FIGS. 6A to 6C and FIGS. 7A to 7C. Thus, the reflecting layer 17 is produced on the transparent layer 16 by sputtering of aluminum and further is adhered onto the disc support layer 18 by using the ultra-violet curing resin 19, as shown in FIGS. 10A to 10C.

The master disc-forming step of the optical disc according to this embodiment can be performed in the same manner as that used in the first embodiment and therefor a detailed explanation therefor is omitted here.

Figure 11A:
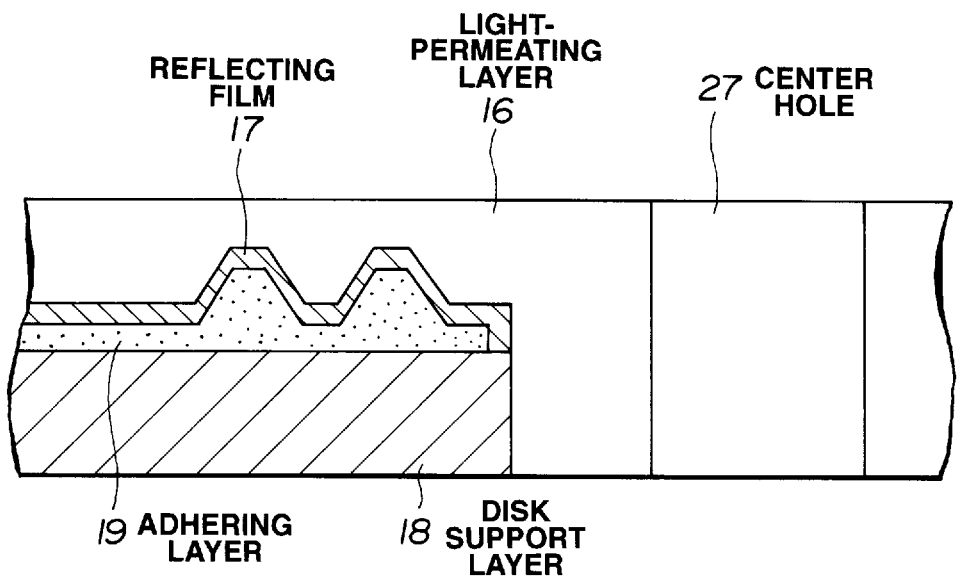
FIG. 11A and 11B are views showing a manner for carrying out centering of a center bore of the optical disc according to the second embodiment of the present invention, when the transparent layer is adhered to the disc substrate.
Figure 11B:
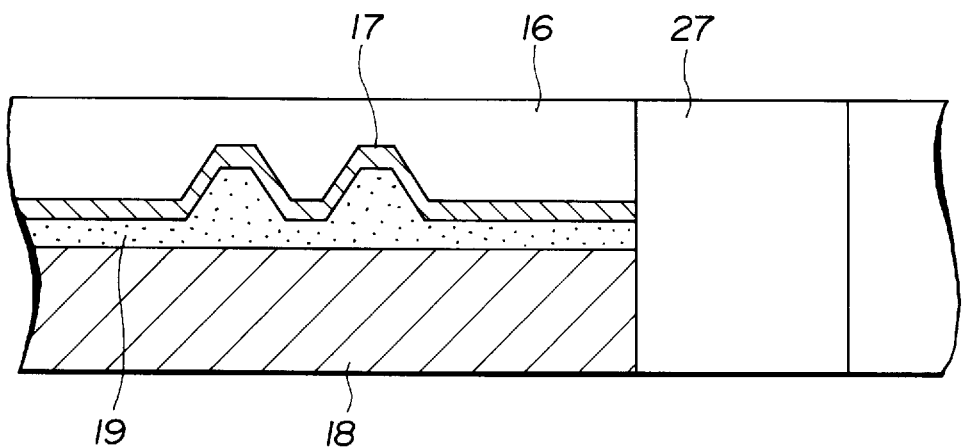

In the injection molding step according to the second embodiment, the Ni master disc 10 is first placed in the press 11 into which a polycarbonate resin melted at an elevated temperature is poured, in the same manner as shown in FIGS. 5A and 5B. However, in this case, not the disc support layer 18 but the transparent layer 18 is subjected to the compression molding process. The thus-compression molded transparent layer 16 has a thickness of 0.5 mm. Incidentally, upon the formation of the transparent layer 16, as shown in FIG. 11A, centering of a chucking center hole 27 of the disc support layer 18 is carried out simultaneously when the transparent layer 16 is adhered onto the disc support layer 18, to thereby facilitate the subsequent adhering step and eliminate complicated positioning of the center hole 27.

Next, the reflecting layer 17 is deposited over the transparent layer 16 by sputtering of aluminum. The transparent layer 16 is adhered onto the disc support layer 18 having an adequate mechanical strength through the reflecting layer 17 in the following manner. First, as shown in FIG. 10B, sputtering of aluminum is carried out to deposit the reflecting layer 17 having a thickness of about 500 Å over the transparent layer 16. Next, as shown in FIG. 10C, the transparent layer 16 is adhered onto the disc support layer 18 through the reflecting layer 17 and a layer made of an ultra-violet curing resin. In this case, since a light permeability through the aluminum reflecting layer having a thickness of 500 Å is 1% or less, a curing time thereof becomes too long. In consequence, a thickness of the reflecting layer 17 is restricted to about 200 Å which is a minimum value required to obtain a necessary reflection coefficient. In addition, a hot-melt adhesive can be used instead of the ultra-violet curing resin.

Thus, in the optical disc according to the second embodiment of the present invention, there can be obtained the transparent layer having a thickness of about 0.5 mm. As a result, even though a numerical aperture of an objective lens 20 used in the optical pick-up device is large, deterioration of a reproduction signal due to a coma aberration can be prevented to some extent, whereby a high density reproduction can be achieved. Further, in the second embodiment, the disc support layer 18 having a predetermined thickness is prepared in a separate step and adhered onto the transparent layer 16 through the reflecting layer 17 and the ultra-violet curing resin layer 19 so that the manufacturing of the optical disc is further simplified and facilitated.

In the following, there is explained an optical disc according to the third embodiment of the present invention, which is provided with a recording layer instead of the reflecting layer of the optical discs according to the first and second embodiments. That is, the optical disc according this embodiment is of a magneto-optical type.

The magneto-optical disc described here can be manufactured in the same manner as those of the first and second embodiments. Therefore, an explanation therefor is omitted here.

Figure 12:
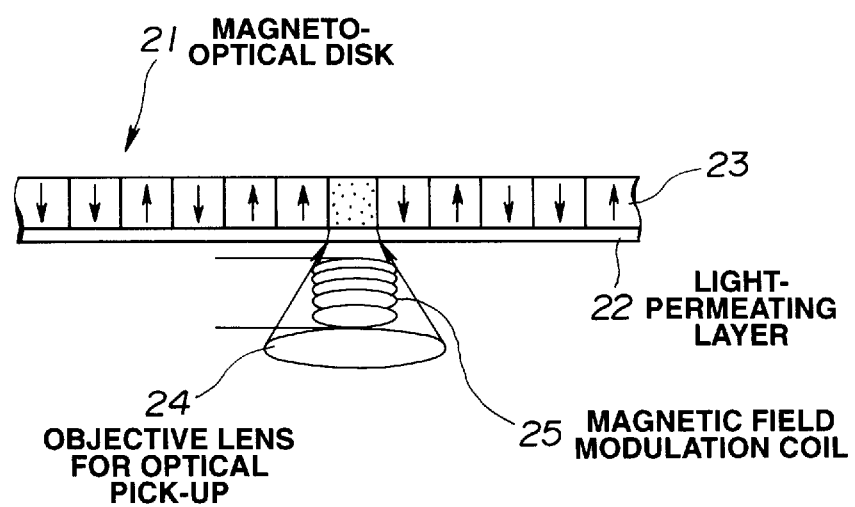
FIG. 12 is a view showing a structure of an magneto-optical disc according to a third embodiment of the present invention.

As shown in FIG. 12, the magneto-optical disc 21 according to the third embodiment of the present invention has a transparent layer 22 having a small thickness, for example, 0.1 mm. For this reason, an objective lens 24 of the optical pick-up device and a magnetic field modulation coil 25 are positioned on the same side of the magneto-optical disc 21, namely on the transparent layer side opposite to the recording layer 23. This enables reduction in size of a recording and reproducing apparatus used for recording and reproducing the magneto-optical disc 21.

As described above, in the production methods for the optical discs or the magneto-optical disc according to the preferred embodiments of the present invention, a total thickness thereof can be reduced as compared with the conventional ones. For this reason, the optical or magneto-optical discs according to the present invention can be used in a reproduction optical pick-up device equipped with a condensing system having a larger condensing rate than conventional ones whose condensing system is composed of only an objective lens.

An optical pick-up device usable for reproducing the optical or magneto-optical disc according to the present invention is explained below by referring to FIG. 13. The optical pick-up device 30 includes a laser diode 31 as a light source for emitting a laser beam. The laser beam emitted from the laser diode 31 passes through in turn a diffraction grating 32, a polarizing beam splitter 33, a ¼ (quarter) wave plate 34 and a collimator lens 35 and is incident on an objective lens system 36. The incident laser beam is converged through the objective lens system to a signal-recording surface of the optical disc 26. The laser beam is then reflected from the signal-recording surface of the optical disc 26 and passes back through a condensing lens 40 to be introduced into a photo-detector as a light-detecting element from which an output of a reproduction signal corresponding to the information signal is generated.

The laser beam emitted from the laser diode 31 is a linearly polarized laser beam which is then diffracted through the diffraction grating 32. The laser beam proceeds through the polarizing beam splitter 33 and the ¼ (quarter) wave plate 34. At the ¼ (quarter) wave plate 34, the diffracted laser beam is changed to a circularly polarized beam and then passes through the collimator lens 35. When passing through the collimator lens, the laser beam is converged into a parallel ray and incident on the objective lens system 36.

The objective lens system 36 is composed of an objective lens 37, a correcting plate 38 and a semi-spherical lens 39 as a convex lens. The objective lens system 36 can converge the incident laser beam on a point F, which is located on the signal-recording surface of the optical disc 26, without occurrence of an optical path difference. The correcting plate 38 corrects the incident laser beam such that the laser beam passing through the correcting plate 38 toward the optical disc forms a spherical wave having a center approximately located at the point F. The semi-spherical lens 39 has a spherical surface 39$a$ whose curvature center is approximately located at the point F, and a flat surface 39$b$.

Figure 14:
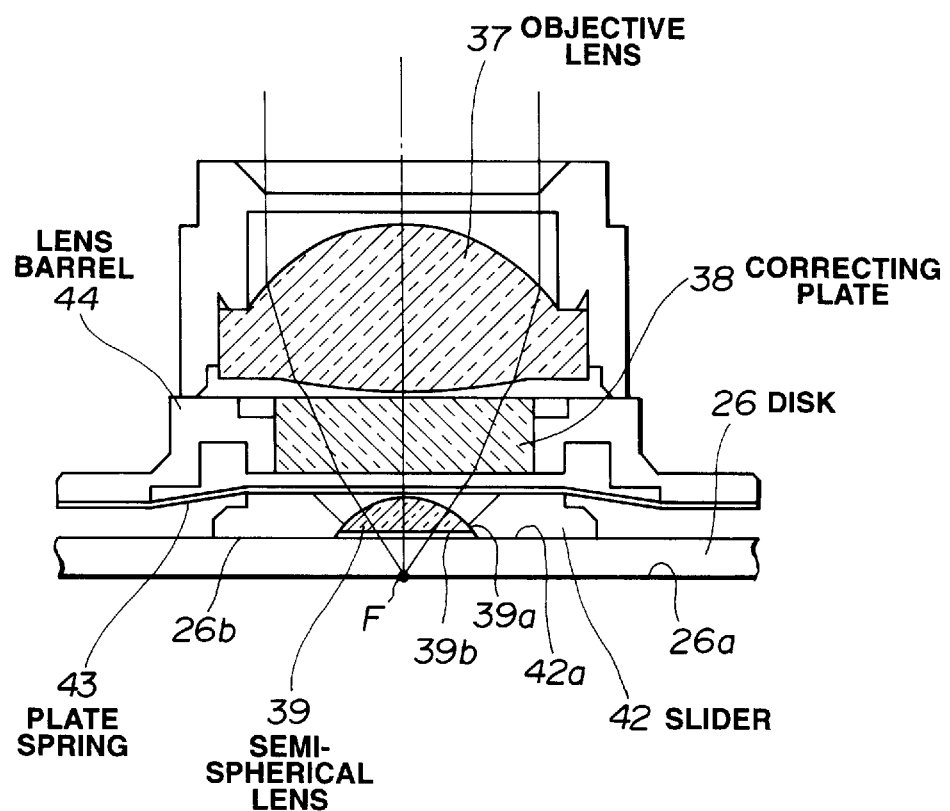
FIG. 14 is a sectional view showing an objective lens system of the optical pick-up device as shown in FIG. 13.
Figure 15:
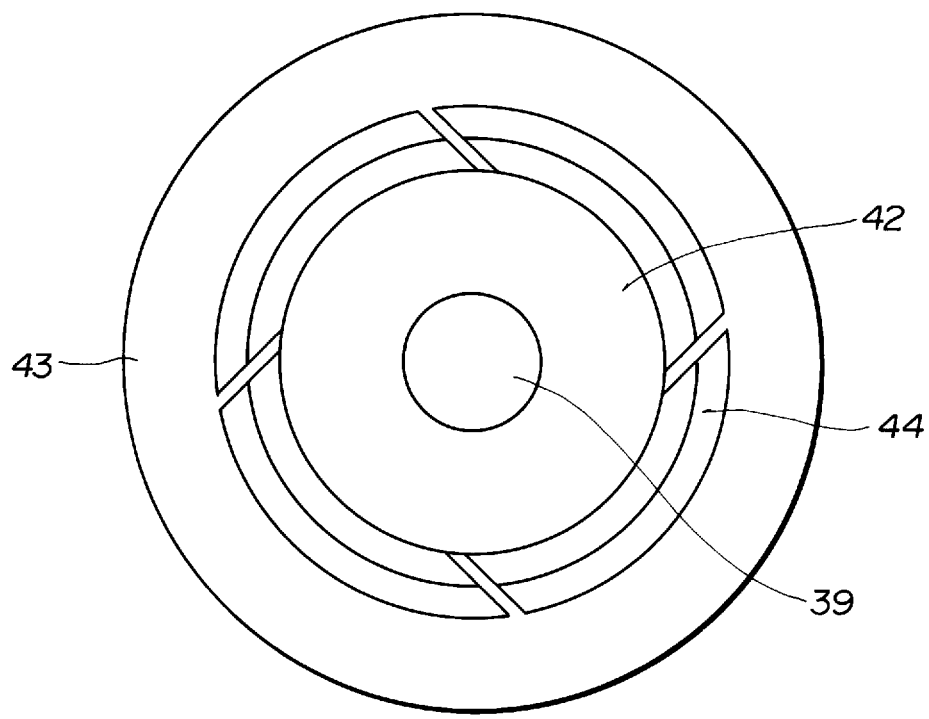
FIG. 15 is a plan view showing the objective lens system as shown in FIG. 14.

The detailed structure of the objective lens 36 is illustrated in FIGS. 14 and 15. FIG. 14 is a sectional view of the objective lens system 36 and FIG. 15 is a schematic plan view of the objective lens system 36 when viewed from a side of the optical disc 26.

The objective lens 37 and the correcting plate 38 are secured to a lens-barrel 44 and prevented from moving in any direction without a degree of freedom. The semi-spherical lens 39 is fixedly mounted on a slider 42. The slider 42 and the lens-barrel 44 are connected with each other through a plate spring 43 and have a translatory freedom in the direction of the thickness of the optical disc 26 and a freedom capable of following the inclination of the optical disc 26. The slider 42 is forced against the optical disc 26 by a biasing force of the plate spring such that a sliding surface 42$a$ of the slider 42 is slidably moved over a light-incident surface 26$b$ of the optical disc 26. At this time, the plate spring 43 does not have a translatory freedom in the direction parallel with the light-incident surface 26$b$ of the optical disc 26 so as not to cause a relative displacement between the objective lens 37 and the semi-spherical lens 39. The sliding surface 42$a$ of the slider 42 is disposed approximately in parallel with the flat surface of the semi-spherical lens 39. The sliding surface 42$a$ and the flat surface 39$b$ may be located at the same plane unless the semi-spherical lens 39 is in contact with the optical disc 26. Actually, the flat surface 39$b$ of the semi-spherical lens 39 is offset by several microns from the sliding surface 42$a$ of the slider 42.

An operation of the objective lens 36 is described below.

The laser beam incident on the objective lens 37 is converged by the objective lens 37 and reaches the correcting plate 38. The correcting plate 38 has a predetermined thickness and a predetermined refractive index such that the laser beam coming out therefrom and condensed thereby forms a spherical wave having a center located at the point F. As described above, the spherical surface of the semi-spherical lens 39 has a center of curvature approximately aligned with the point F. The refractive indices of the optical disc 26 and the semi-spherical lens 39 is set to predetermined values which are approximately identical to each other. For this reason, the laser beam from the correcting plate 38 is vertically incident on the spherical surface 39$a$ of the semi-spherical lens 39 and converged to form a spherical wave having a center located at the point F.

The objective lens 37 has a numerical aperture NA represented by the equation: NA=$\sin\theta$ where $\theta$ is an angle made by the objective lens 37 when viewed from a minimum spot $S_{min}$. If the semi-spherical lens 39 and the optical disc have a refractive index N, the numerical aperture NA of the objective lens system 36 is represented by NA=$N\sin\theta$. Accordingly, when such an objective lens system 36 is used, a spot size obtained from the objective lens system 36 as a whole is 1/N times the spot size obtained from the objective lens 37 only, whereby a reproduction density of the optical disc 26 is increased.

Next, an operation of the objective lens system 36 is explained concerning the case where the optical disc 26 is inclined relative to an optical axis $L_O$ of the objective lens 37.

Even though the optical disc 26 is inclined relative to the optical axis $L_O$ of the objective lens 37, since the sliding surface 42$a$ of the slider 42 is in sliding contact with the light-incident surface 26$b$ of the optical disc 26 by the biasing force of the plate spring 43, the curvature center of the semi-spherical lens 39 is still located approximately on the optical axis $L_O$ of the objective lens 37. For this reason, the laser beam coming out from the correcting plate 38 is vertically incident on the spherical surface 39$a$ of the semi-spherical lens 39 so that no optical path difference occurs. As a result, there occurs no coma aberration irrespective of the numerical aperture of $N\sin\theta$ of the objective lens system.

Figure 13:
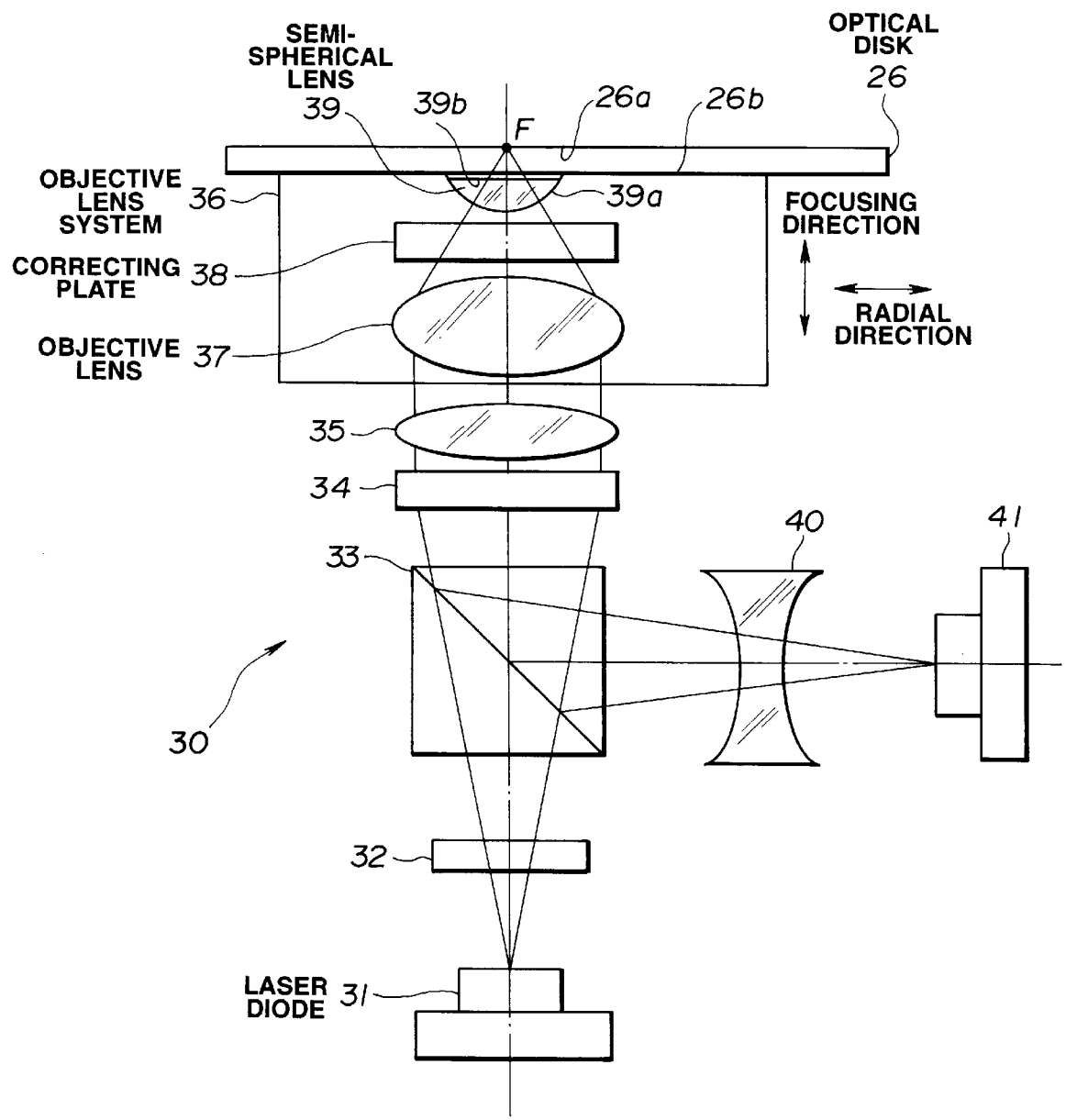
FIG. 13 is a schematic view showing an optical pick-up device applicable to reproduction of the optical recording medium according to the present invention.

Accordingly, the use of the optical recording medium according to the present invention enables an optical pick-up device of such a type as shown in FIG. 13 to be applicable, by which a high density reproduction can be achieved. In addition, when the optical device 30 is employed, there can be obtained a large tolerance with respect to warpage of the optical recording medium upon its manufacture and due to absorbed moisture, and a yield of manufacture of the optical disc and a selective freedom of a material for the optical disc can be increased. Moreover, in a drive mechanism of an optical disc, large tolerances concerning the relative perpendicular arrangement between an optical axis of the optical system for the optical pick-up device and a mounting surface of the optical disc, and concerning an feed accuracy of the optical pick-up device can be achieved, whereby reduction in cost for manufacturing the optical disc drive mechanism can be accomplished.

Meanwhile, as will be appreciated, the optical recording medium and the production method therefor according to the present invention are applicable not only to those described in the afore-mentioned first to third embodiments but also to optical discs of such a type in which transparent layers and signal-recording layers are provided on opposite sides thereof and the production method therefor.

As described above in detail, according to the present invention, since the transparent layer has as small a thickness as, for example, 0.5 mm or less, a high density reproduction can be achieved. In addition, in the magneto-optical recording medium according to the present invention, since the magnetic field modulation coil and the optical pick-up device can be disposed on the same side on which the transparent layer is provided, reduction in size of the recording and reproducing apparatus can be achieved.

Moreover, the use of the optical recording medium and the production method therefor enables the use of the objective lens system having a large numerical aperture NA, a high density reproduction is furthermore promoted.

What is claimed is:

1. An optical recording medium capable of recording and/or reproducing an information by using a laser beam, comprising:

a support layer having an information signal-recording portion on one side surface thereof on which said laser beam is incident; and a transparent layer disposed over said support layer and having a thickness not more than 0.5 mm; and a reflective layer interposed between said support layer and said transparent layer.

2. The optical recording medium according to claim 1, wherein said information signal-recording portion is composed of a magnetic recording film.

3. The optical recording medium according to claim 1, wherein said transparent layer has a thickness of about 0.1 mm.

4. The optical recording medium according to claim 1, wherein said transparent layer is composed of an ultra-violet-curing resin layer.

5. The optical recording medium according to claim 1, wherein said transparent layer is a transparent flat plate and is disposed through a transparent adhesive layer on said reflecting layer.

6. The optical recording medium according to claim 1, wherein said information signa-recording portion is composed of a magnetic recording film.

7. The optical recording medium according to claim 1, wherein said transparent layer is composed of an ultra-violet-curing resin layer.

8. The optical recording medium according to claim 1, wherein said transparent layer is a transparent flat plate and is disposed through a transparent adhesive layer on said reflecting layer.

9. The optical recording medium according to claim 1, wherein said transparent layer is a transparent flat plate and is disposed through a transparent adhesive layer on said reflecting layer.

10. An optical recording medium capable of recording and/or reproducing information by using a laser beam, comprising:

a support layer having an information signal-recording portion on one side surface thereof on which said laser beam is incident;

a transparent layer disposed over said support layer and having a thickness not more than 100 micrometers; and a reflecting layer interposed between said support layer and transparent layer.

11. A method of producing an optical recording medium, comprising the steps of:

pouring a material for a substrate into a press while heating and subjecting the material to a compression molding to form the substrate having transferred information pits thereon;

forming a reflecting layer over said substrate; and forming a transparent layer capable of permeating a laser beam and having a thickness not more than 0.5 mm over said reflecting layer.

12. The method according to claim 11, wherein said transparent layer is produced by spin-coating an ultra-violet curing resin and then curing said spin-coated ultra-violet curing resin.

13. The method according to claim 11, wherein said transparent layer is produced by subjecting an optically transparent hard substance to a vapor deposition or sputtering.

14. The method according to claim 11, wherein said transparent layer is produced by adhering a polycarbonate film or a glass plate onto said reflecting layer through an ultra-violet curing resin.

15. The method according to claim 11, wherein said transparent layer has a thickness of about 0.1 mm.

16. The method according to claim 11, wherein said reflecting layer is grown and deposited on said information pits in the direction perpendicular to a surface of said optical disc.

17. The method according to claim 11, wherein said information pits each have a size enough to correct a deformation thereof occurring upon formation of said reflecting layer.

18. A method of producing an optical recording medium, comprising the steps of:

pouring a transparent resin into a press while heating, and subjecting the resin to a compression molding process to form a transparent layer having transferred information pits thereon;

forming a reflecting layer having a thickness not more than 0.5 mm over said information pits formed on said transparent layer; and adhering said transparent layer onto a substrate having a thickness larger than that of said light-permeating layer through the reflecting layer.

19. The method according to claim 18, wherein centering of a center axis of said optical disc is performed upon formation of said transparent layer.

20. A method of producing an optical recording medium capable of writing an information thereon and reading the information therefrom by using a laser beam, comprising the steps of:

forming a magnetic recording film on one side surface of a substrate on which said laser beam is incident; and forming a transparent layer having a thickness not more than 0.5 mm over said magnetic recording film.

21. The method according to claim 20, wherein said transparent layer has a thickness of about 0.1 mm.

* * * * *

UNITED STATES PATENT AND TRADEMARK OFFICE
CERTIFICATE OF CORRECTION

PATENT NO. : 5,846,626
DATED : December 8, 1998
INVENTOR(S) : Toshiyuki KASHIWAGI, Motohiro FURUKI, Shoji FUKUCHI and Yoshitake YANAGISAWA It is certified that error appears in the above-identified patent and that said Letters Patent is hereby corrected as shown below:

Claim 6 should read:

6. The optical recording medium according to claim 1, wherein said information signal-recording portion is composed of a magnetic recording film.

Signed and Sealed this

Seventh Day of September, 1999

Attest:

Q. TODD DICKINSON

Attesting Officer    Acting Commissioner of Patents and Trademarks